Patented Feb. 5, 1952

2,584,751

UNITED STATES PATENT OFFICE 2,584,751

SILYLPHENOXYALCOHOLS

John L. Speier, Jr., Pittsburgh, Pa., assignor to Dow Corning Corporation, Midland, Mich., a corporation of Michigan No Drawing. Application January 8, 1951, Serial No. 205,031

4 Claims. (Cl. 260—448.2)

This invention relates to silylphenoxyalcohols.

It is an object of this invention to prepare novel compositions of matter which are useful as intermediates in the preparation of organo-silicon polymers. Another object is to prepare compounds which are useful as emulsifiers and detergents.

This invention relates to compounds of the formula $(CH_3)_3SiC_6H_4OCH_2CHR'OH$ where R' is a methyl radical or hydrogen.

Alcohols of the above type are prepared by hydrolyzing compounds of the formula $(CH_3)_3SiC_6H_4OCH_2CHR'OSiR_3$ in which R is a monovalent hydrocarbon radical. The hydrolysis is carried out under the normal conditions for hydrolyzing silane esters, such as by treating the ester with aqueous acid. If desired, a mutual solvent may be employed. The products of the reaction are the above alcohols and hexaorganodisiloxanes.

The silane esters are in turn prepared by reacting compounds of the formula $R_3SiOCH_2CHR'OC_6H_4Cl$ with trimethylchlorosilane and sodium in refluxing toluene. In this process a Wurtz type reaction results, whereby the trimethylsilyl group is attached to the phenyl ring with the simultaneous production of sodium chloride.

The compounds of the formula $R_3SiOCH_2CHR'OC_6H_4Cl$ are described and claimed in the applicant's copending application Serial No. 205,032, filed concurrently herewith. In these compounds R is any monovalent hydrocarbon radical. They may be prepared by reacting alcohols of the formula $ClC_6H_4OCH_2CHR'OH$ with a chlorosilane of the formula $R_3SiCl$. The chlorophenoxy alcohols are commercially available materials sold under the name "Dowanol".

The following examples are illustrative only and should not be construed as limiting the invention, which is properly set forth in the appended claims.

Example 1

323 grams of 1-p-chlorophenoxy-2-propanol was dissolved in 200 ml. of dry toluene and 99 grams of dry pyridine. 150 grams of trimethylchlorosilane was then slowly added with shaking and cooling. Pyridine hydrochloride precipitated and was removed by filtration. The filtrate was mixed with 150 grams of trimethylchlorosilane and the mixture was slowly added to 62 grams of molten sodium in refluxing toluene. During the addition, the mixture was vigorously stirred. Refluxing was continued for two hours after addition was complete. The mixture was filtered, and after removal of toluene and excess chlorosilane the compound 1-(p-trimethylsilylphenoxy)-2-propoxytrimethylsilane $[p-(CH_3)_3SiC_6H_4OCH_2CH(CH_3)OSi(CH_3)_3]$ was obtained. This material had a boiling point of 176° C. at 24 mm., $n_D^{25}1.4772$, $d_4^{25}.924$, and a specific refraction of .3057.

123 grams of the above ester was hydrolyzed in aqueous alcohol. The product was taken up in n-hexane, dried, and cooled. Upon standing at room temperature, crystals soon formed which had a melting point of 57° C. to 59° C. Upon cooling the solution, more crystals having the same melting point were obtained, giving a total of 72 grams. All of the crystal fractions were combined and recrystallized to give a material melting 62° C. to 63° C. This material was 1-(p-trimethylsilylphenoxy)-2-propanol $[p-(CH_3)_3SiC_6H_4OCH_2CHOHCH_3]$

Example 2

A mixture of 91 grams of trimethylchlorosilane and 186 grams of 2(p-chlorophenoxyethoxy)trimethylsilane was added slowly with vigorous stirring to 40 grams of sodium in 300 ml. of refluxing toluene. After the addition was complete, refluxing was continued one hour, after which the mixture was filtered and distilled to yield 172 grams of 2(p-trimethylsilylphenoxy)ethoxytrimethylsilane $[p-(CH_3)_3SiC_6H_4OCH_2CH_2OSi(CH_3)_3]$ boiling point 172° C. at 26 mm., $n_D^{25}1.4827$, $d_4^{25}.935$, and a specific refraction of .3053.

172 grams of the above ester was hydrolyzed in an equal volume of aqueous acetone containing hydrochloric acid. The hydrolysis mixture was subsequently washed with water and distilled. There was obtained hexamethyldisiloxane and 118 grams of p-trimethylsilylphenoxyethanol, boiling point 128° C. at .7 mm., $n_D^{25}1.5151$, $d_4^{25}1.001$, and a specific refraction of .3013.

Example 3

A mixture of 102 grams of trimethylchlorosilane and 209 grams of o-chlorophenoxyethoxytrimethylsilane was added slowly with stirring to 42.5 grams of sodium in 300 ml. of refluxing toluene. The product was worked up in the manner cribed in Example 2 and there was obtained ) grams of o-trimethylsilylphenoxyethoxytriethylsilane

[o-(CH$_3$)$_3$SiC$_6$H$_4$OCH$_2$CH$_2$OSi(CH$_3$)$_3$]

ling point 166° C. at 24 mm., $n_D^{25}$ 1.4818, 5.9449, and a specific refraction of .3016.
!03 grams of the above ester was hydrolyzed aqueous acetone with HCl catalyst. The hydrolysis product was washed, dried, and distilled give 55.5 grams of hexamethyldisiloxane and ) grams of o - trimethylsilylphenoxyethanol -CH$_3$)$_3$SiC$_6$H$_4$OCH$_2$CH$_2$OH], boiling point 106° C. at .8 mm., $n_D^{25}$ 1.5157, $d_4^{25}$ 1.012, and a specific refraction of .2983.

That which is claimed is:
1. A compound of the formula (CH$_3$)$_3$SiC$_6$H$_4$OCH$_2$CHR'OH where R' is selected from the group consisting of methyl radicals and hydrogen.
2. p-(CH$_3$)$_3$SiC$_6$H$_4$OCH$_2$CHOHCH$_3$.
3. p-(CH$_3$)$_3$SiC$_6$H$_4$OCH$_2$CH$_2$OH.
4. o-(CH$_3$)$_3$SiC$_6$H$_4$OCH$_2$CH$_2$OH.

JOHN L. SPEIER, Jr.

No references cited.